J. R. GIBSON & J. POWELL.

WASTE-WAY STOPPER.

No. 7,162. Reissued June 6, 1876.

Attest.

Harry S. Knight.
Walter Knight

Joshua R. Gibson
James Powell
By Knight Bros. Attys.

N. PETERS, PHOTO-LITHOGRAPHER, WASHINGTON, D. C.

UNITED STATES PATENT OFFICE.

JOSHUA R. GIBSON AND JAMES POWELL, OF CINCINNATI, OHIO, ASSIGNORS TO SAID POWELL.

IMPROVEMENT IN WASTEWAY-STOPPERS.

Specification forming part of Letters Patent No. 117,402, dated July 25, 1871; reissue No. 7,162, dated June 6, 1876; application filed February 29, 1876.

DIVISION A.

*To all whom it may concern:*

Be it known that we, JOSHUA R. GIBSON and JAMES POWELL, both of Cincinnati, Hamilton county, Ohio, have invented a new and useful Improvement in Wasteway-Stoppers for use with earthenware or porcelain or enameled-ware wash-basins; and we hereby declare the following to be a full, clear, and exact description thereof, reference being had to the accompanying drawings, making part of this specification.

Our invention relates to that class of earthenware, porcelain, or enameled wash-basins in which an opening is provided in the bottom of the basin for the ready discharge of the waste-water, which opening is closed, when desired, by a plug or stopper.

In the ordinary construction of such vessels it has been customary to provide a plug or stopper to the waste-passage, of metal, porcelain, or other hard material; and, when made in this form, it has been necessary to bestow considerable labor upon such stoppers, and, finally, to grind them to their seats or bearings in the wasteway, in order to insure the retention of the water while being used. The necessity of grinding applies equally whether the stopper be made of metal, or porcelain, or earthenware, and, owing to the fragile nature of the latter material, composing the stopper or basin, or both, the liability to damage or fracture, in consequence of the stopper being suddenly dropped into the empty basin by careless operators, is such as to cause great annoyance and loss from its use.

The object of our invention is to provide a light and highly elastic form of stopper, which shall preclude any possibility of breakage by its use with any porcelain, earthenware, or enameled basin, and which shall, at the same time, insure great economy and expedition of manufacture, and quite obviate the necessity of having to grind the stopper to a bearing to render the same water-tight.

Figure 1:
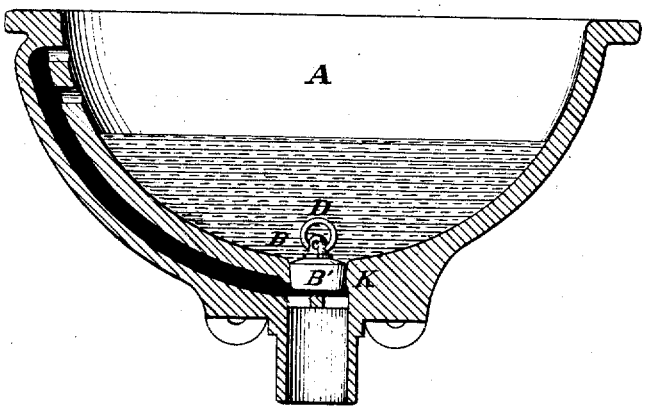
Figure 2:
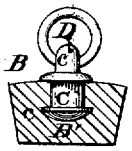
Figure 3:
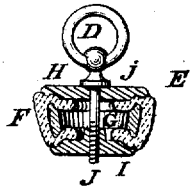

Figure 1 represents, by axial section, a basin of earthenware, porcelain, or enameled ware, whose wasteway or socket consists of a conical tube, within which the wasteway plug or stopper is seen in elevation. Fig. 2 is an axial section of one form of our plug. Fig. 3 is an axial section of a modification of our plug.

A represents a porcelain, earthenware, or enameled basin of the usual form. K represents the customary conical discharge-orifice or wasteway, constituting a socket for the plug or stopper. B is the plug or stopper, composed of vulcanized india-rubber, B′, or other analogous material. C is the shank or stem, terminating below in a swell, *c*, by which it is anchored within the plug, and above in a perforated head, *c′*, through which passes a ring, D, by which the plug is lifted out of its place. The sides of the plug are made tapering, to fit the corresponding taper hole or socket K in the basin. The plug or stopper may be formed of solid rubber, molded while in the plastic state in an iron mold, and then vulcanized in the usual manner of preparing rubber articles.

E, Fig. 3, is a stopper, constructed by confining a tube, ring, or disk of rubber packing, F, upon the mole G, between two washers, H and I, of which the lower washer, I, may be a nut, which, in conjunction with collar *j* of stem J, operates to firmly clamp the rubber packing F upon the mole G.

A plug made as shown in Fig. 3 may be adapted to a larger or smaller socket, by causing the washers to approach or recede from one another, so as to bring a greater or less compression upon the packing.

We are aware that it has before been proposed to clamp a thin disk of rubber between two parts of a metallic plug, to form a packing therefor. This we do not claim.

We claim herein as new and of our invention—

1. A wasteway-plug having its bearing-sides constructed wholly of rubber, or equivalent yielding material, for the purposes set forth.

2. The elastic packing F, mole G, washers H I, and stem J *j*, combined and arranged substantially as and for the purposes set forth.

In testimony of which invention we hereunto set our hands.

JOSHUA R. GIBSON.
JAMES POWELL.

Attest:
GEO. H. KNIGHT,
S. B. SPEAR.